United States Patent [19]

Bodine et al.

[11] Patent Number: 4,771,982
[45] Date of Patent: Sep. 20, 1988

[54] SLIDABLE ELECTRIC VALVE DEVICE HAVING A SPRING

[75] Inventors: James A. Bodine, Walnut Creek; Judson S. Kuehn, San Rafael; William H. Silcox, San Francisco, all of Calif.

[73] Assignee: Chevron Research Company, San Francisco, Calif.

[21] Appl. No.: 21,923

[22] Filed: Mar. 5, 1987

Related U.S. Application Data

[63] Continuation of Ser. No. 863,205, May 14, 1986, Pat. No. 4,681,298.

[51] Int. Cl.$^4$ ............................................. F16K 31/06
[52] U.S. Cl. ............................... 251/129.1; 251/129.15
[58] Field of Search ......................... 251/129.1, 129.15

[56] References Cited

U.S. PATENT DOCUMENTS

| | | | |
|---|---|---|---|
| 1,252,312 | 1/1918 | Warren | 251/129.1 X |
| 1,475,129 | 11/1923 | Mayer | 251/129.1 |
| 3,484,076 | 12/1969 | Naumann | 251/129.15 |
| 3,666,231 | 5/1972 | Parodi et al. | 251/129.1 |
| 3,851,285 | 11/1974 | Rothfuss et al. | 251/129.15 |
| 4,056,255 | 11/1977 | Lace | 251/129.15 |
| 4,065,096 | 12/1977 | Frantz et al. | 251/129.1 |

FOREIGN PATENT DOCUMENTS

| | | | |
|---|---|---|---|
| 1086506 | 8/1960 | Fed. Rep. of Germany | 251/129.15 |
| 214451 | 4/1924 | United Kingdom | 251/129.15 |

*Primary Examiner*—Arnold Rosenthal
*Attorney, Agent, or Firm*—S. R. LaPaglia; E. J. Keeling; V. A. Norviel

[57] ABSTRACT

The present invention relates to an electric valve device used in remotely operable applications. It comprises a valve body with a centrally placed slidable valve core. The core has an aperture for fluid passage and may be held in position by an electromagnet in the valve body. Windings are placed in one end of the valve body so that they encircle the slidable core and a spring is placed in the other end. To move the core, a DC current source is connected to the windings so that when they are energized a force is generated to move the core in a specific direction. The core is then held in this position by the contact between the electromagnet in the valve body and the valve core until the current in the magnetic windings is switched off, then the spring return to the core to its original, closed position.

1 Claim, 1 Drawing Sheet

U.S. Patent  Sep. 20, 1988  4,771,982
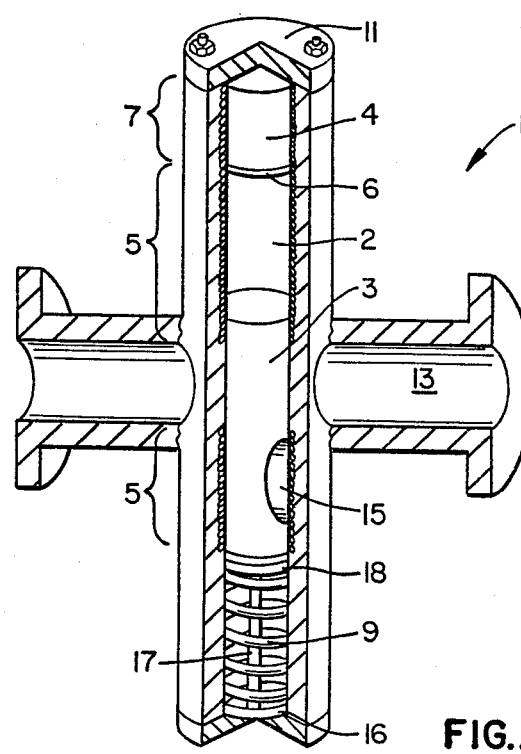
FIG._2.
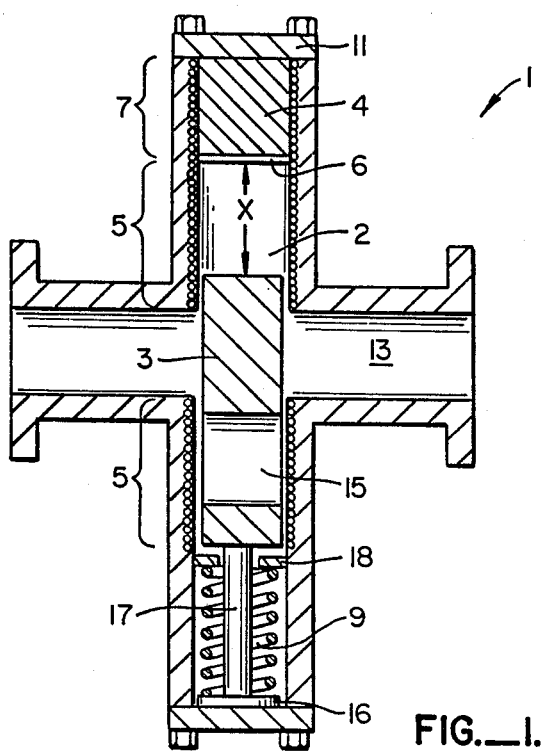
FIG._1.

SLIDABLE ELECTRIC VALVE DEVICE HAVING A SPRING

This is a continuation of application Ser. No. 863,205, filed May 14, 1986, now U.S. Pat. No. 4,681,298, dated Jul. 21, 1987.

This application is related to application Ser. No. 655,391, filed Sept. 27, 1984, now abandoned and application Ser. No. 655,393, filed Sept. 27, 1984 now U.S. Pat. No. 4,580,761.

FIELD OF INVENTION

This device relates to electrically actuated flow control devices. More specifically, to electromagnetic valves for use in subsea operations.

BACKGROUND OF THE INVENTION

In oil drilling and producing operations, there exists a need for subsea valves they can be actuated from a remote location. Currently, subsea valves are employed that use hydraulic, manual, or electric controls, but these do not work perfectly for a variety of reasons. For example, hydraulic controls, when operated from a position above the water surface, require long hydraulic control lines which may rupture or suffer delays in actuation. Manually operated valves are likewise imperfect for obvious reasons, such as the need for divers or remotely operated vehicles, slow response time, possibly hazardous depths and water conditions, etc. Electric valves that are currently employed in subsea uses are small pilot valves that operate control systems rather than the main flowline. Once the electrically operated pilot valve is triggered, it, in turn, actuates a larger hydraulic valve to control the primary flowline. Since these pilot valves are small, capable of handling only a low fluid volume, and cannot be scaled up to a larger size (as the designs are not linear), they cannot be used in the primary system. Other objections to electric valves, in general, are that: some require continuous power in each valve position and therefore more energy, they may have components that are susceptible to wear which requires more frequent maintenance, they may be too large and complex, or the time response for actuation may be too slow. Consequently, many of these designs are not feasible for subsea applications.

Examples of electromagnetic valves or ones that use windings: Gast et al., U.S. Pat. No. 4,392,632; Lynes et al., U.S. Pat. No. 3,484,074; Kawata et al., U.S. Pat. No. 4,350,319; Hashimoto, U.S. Pat. No. 4,286,767; and Inada et al., U.S. Pat. No. 4,346,736. Magnetically actuated pilot valves are illustrated by: Kah, U.S. Pat. Nos. 4,349,045 and 4,320,023, and Raymond, U.S. Pat. No. 4,053,137.

For these reasons, it is an object of this invention to provide a remotely actuable primary valve for use in the main flowline that is efficient, highly reliable, and preferably simple. It is a further object of this invention to reduce the subsea valve operator size, decrease the response time, and eliminate the need for costly hydraulic umbilicals.

SUMMARY OF THE INVENTION

Generally speaking, the present invention relates to a main flowline electromagnetic valve for subsea applications. It comprises a slidable core, made of a ferrous material, placed within a valve body. The core has an aperture, which, when placed in communication with an aperture in the valve body, allows fluid to pass through the valve. The valve body also has a passage or space for the core to slide and is defined at one end by an electromagnet and at the other by a coil spring. Main windings are wrapped within the valve body passage in such a way that they encircle the slidable core member. Smaller, lower energy windings are also wrapped around the electromagnet in the upper valve core.

To operate the valve, current is applied to the main windings to energize them. This creates a directional magnetic field and causes the core member to move from a closed position to one in which the core aperture is in communication with the valve aperture. The core is held there by the attractive force between the energized electromagnet and the core. When the operator wishes to close the valve, all that is required is to cut the power to the windings in the electromagnet as the gate design is a fail-close valve. When current is stopped, the electromagnet is de-energized and can no longer hold onto the core. Consequently, the coil spring returns the core to the original, closed position.

FIG. 1 is a sectional view of the preferred form of apparatus in accordance with the present invention, and FIG. 2 is a perspective view of the preferred form of the invention with portions broken away for clarity of presentation.

DETAILED DESCRIPTION OF THE INVENTION

FIG. 1 represents cross-sectional side view of an electromechanical valve 1 in the closed position having a slidable core member 3 fit within a fluid tight valve body 11. The lengthwise cross section (FIG. 1) of core 3 is generally a rectangle, but the widthwise cross section (see FIG. 2) may be essentially anything from a circle to a rectangle. Core 3 has a centrally located aperture 15 perpendicular to its lengthwise axis which provides for fluid flow through valve 1 upon communication with a valve body aperture 13. Valve body 11 has a passage 2 which allows the core 3 to slide either open or closed. Both the valve body 11 and the core 3 may be ferrous or any other material that is subject to magnetic attraction. The core 3 is connected to the valve body 11 at its lower end by a coiled spring, which, as shown in FIGS. 1 and 2, is in the relaxed position. The valve body passage 2 that allows the core 3 to slide open or closed is bordered at one end by a core spring 9 that is attached to the core 3 and the valve body 11 and at the other by an electromagnet 4 and a dielectric buffer 6. The valve body 11 has main electroconductive windings 5 which are wrapped around the interior of the passage 2 so that they encircle the core. The electromagnet 4 in the upper part of the valve body 11 also has windings 7 although they are smaller and of lower energy. A means, external to the valve, supplies current to both of the windings.

Valve 1 is operated in the following manner: to open valve 1, a sufficient amount of DC current is used to energize main windings 5 (AC current may be used if some design and geometric changes are made) which creates a magnetic field in the direction of the electromagnet 4. The core 3 is then forced upwards which stretches the spring 9 and the core 3 contacts the dielectric buffer 6. The low power windings 7 are then energized to hold the core 3 in place by magnetic attraction. Once the core 3 is held by the electromagnet 4, the main windings 5 may be de-energized for purposes of economy because the valve 1 is held in the open position.

To close the gate valve 1, all that is required is to shut off power to the low power windings 7. This eliminates the attractive force between the electromagnet 4 and the core 3 and the stretched spring 9 returns the core 3 to the original, closed position. This ensures that if there is a system failure the valve will not remain open.

To determine the amount of force that is required to move the core 3 the full length of travel and overcome the spring force and initial seal friction, we may use this equation:

$$F = \frac{A\mu_o N^2 I^2}{2x^2} \text{ (as expressed in Newtons)}$$

where A is the cross section of the gate area in meters squared, $\mu_o$ is the permeability of free space expressed in Henrys/M, N is the number of turns in the windings, I is the current in amperes, and x is the distance of travel of the core in meters.

Using this formula, a valve may be designed that will fit the size requirements of that particular use. Since the most preferred embodiment of this application is for an undersea, primary flowline operator valve, the size will be sufficient to provide for a large fluid volume and also be strong enough to operate in areas of high pressure without suffering leakage or other damage. (This type of valve will also be adaptable for uses in other remote locations where unmanned operation is important, i.e., outer space.)

Once a subsea tree on the seafloor has these electric valves in place of current hydraulically operated valves, the control cables could be reduced to a single electrical control line with power conductors, signal cables and a control system. The control line would run from a platform with a control desk to a control pod on the subsea wellhead. The control pod would contain relays or other switching devices to apply or terminate DC power to any control wire or any valve. The control signals would be transmitted over the control line using a standard MUX (multiplexer) system. However, a potential future embodiment could produce power locally in the subsea environment. Control lines could be eliminated, and the control signals could be transmitted either acoustically or by other means.

Since many modifications and variations of the present invention are possible within the spirit of this disclosure, it is intended that the embodiments disclosed are only illustrative and not restrictive. For that reason, reference is made to the following claim rather than to the specific description to indicate the scope of this invention.

What is claimed is:

1. A valve for use with subsea production facilities capable of being remotely operated comprising:
   (a) an elongated valve body having a central opening formed along an axis thereof;
   (b) side ports in communication with said central opening spaced apart on said valve body;
   (c) a plug member slidably positioned in said central opening in closely spaced relationship with the interior of said valve body, said plug member being longitudinally movable between at least a first position and a second position;
   (d) a passageway for fluid flow through said plug member, the passageway adapted to align with said side ports when said ferromagnetic member is in said second position to permit fluid flow through said valve body via said side ports and to be out of alignment with said ports when said ferromagnetic member is in said first position to prevent fluid flow through said valve body via said side ports;
   (e) elastic means for urging said ferromagnetic member into said first position in the absence of motivating force urging said plug member to said second position;
   (f) primary coil means located in the interior of said valve body adjacent said central opening and operably positioned to override said elastic means when excited to move said ferromagnetic member to said second position to permit fluid flow in said valve body;
   (g) secondary windings located in the interior of said valve body adjacent said central opening thereof and operably positioned to maintain said ferromagnetic member in said second position;
   (h) a body of ferrous material located in said central opening of said valve body in a position to cooperate with said secondary windings to maintain said ferromagnetic member in said second position;
   (i) a buffer means located between said primary coil and said secondary windings to separate and cushion the body of ferrous material from the plug member;
   (j) means for selectively exciting said primary coil means and said secondary windings;
   (k) conduit means connected to said valve body adjacent to each of said side ports for receiving fluid flow; and
   (l) conduit means for receiving fluid flow through said valve, said conduit means operably connected to subsea production means.

* * * * *